United States Patent
Kagami et al.

(10) Patent No.: US 7,241,514 B2
(45) Date of Patent: Jul. 10, 2007

(54) MAGNETO-RESISTIVE DEVICE, AND MAGNETIC HEAD, HEAD SUSPENSION ASSEMBLY AND MAGNETIC DISK APPARATUS USING MAGNETO-RESISTIVE DEVICE

(75) Inventors: Takeo Kagami, Tokyo (JP); Takumi Uesugi, Tokyo (JP); Satoshi Miura, Tokyo (JP); Norio Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 308 days.

(21) Appl. No.: 10/880,574

(22) Filed: Jul. 1, 2004

(65) Prior Publication Data
US 2005/0008849 A1    Jan. 13, 2005

(30) Foreign Application Priority Data
Jul. 7, 2003 (JP) .............................. 2003-193230

(51) Int. Cl.
*G11B 5/39* (2006.01)
*G11B 5/27* (2006.01)

(52) U.S. Cl. .................. 428/811.1; 428/811.2; 428/811.5; 428/814

(58) Field of Classification Search .................. None
See application file for complete search history.

(56) References Cited
U.S. PATENT DOCUMENTS 5,940,237 A * 8/1999 Takagi ..................... 360/75
6,195,239 B1 * 2/2001 Araki et al. ............ 360/324.11
6,452,385 B1   9/2002 Shimazawa et al.
2001/0026424 A1 * 10/2001 Kamata et al. ............. 360/322
2002/0024778 A1 * 2/2002 Xue et al. ................ 360/324.1
2002/0135951 A1   9/2002 Kasahara et al.
2003/0039080 A1   2/2003 Kagami et al.
2003/0049389 A1 * 3/2003 Tsunekawa et al. ......... 427/569
2003/0058587 A1   3/2003 Hasegawa et al.
2004/0057164 A1 * 3/2004 Parker et al. .......... 360/324.11
2005/0041339 A1 * 2/2005 Horng et al. ............... 360/314
2005/0167770 A1 * 8/2005 Fukuzawa et al. .......... 257/421
2006/0114615 A1 * 6/2006 Pinarbasi ................... 360/322

FOREIGN PATENT DOCUMENTS

JP    A 2000-228003    8/2000
JP    A 2002-100012    4/2002

(Continued)

*Primary Examiner*—Kevin M. Bernatz
(74) *Attorney, Agent, or Firm*—Oliff & Berridge, PLC

(57) ABSTRACT

A magneto-resistive device is provided for contributing to a higher MR ratio and a reduced cleaning time for cleaning the surface of a cap layer. In the magneto-resistive device, a cap layer which serves as a protection layer is formed on a free layer which is the topmost layer of a magneto-resistive layer constituting a TMR devise. An upper electrode which is additionally used as an upper magnetic shield is electrically connected to the free layer through an upper metal layer. The cap layer comprised of a two-layer film made up of a conductive layer closer to the free layer and a topmost conductive layer. The conductive layer closer to the free layer is made of a material having higher oxygen bond energy than Ru, such as Zr, Hf, or the like. The topmost conductive layer is made of a material having lower oxygen bond energy, such as a noble metal or the like.

12 Claims, 9 Drawing Sheets

| | FOREIGN PATENT DOCUMENTS | | | | |
|----|----|----|----|----|----|
| JP | A 2002-216321 | 8/2002 | JP | A 2003-174217 | 6/2003 |
| JP | A 2002-270921 | 9/2002 | JP | A 2003-183838 | 7/2003 |
| JP | A 2003-060262 | 2/2003 | JP | A 2003-204092 | 7/2003 |
| JP | A 2003-067903 | 3/2003 | JP | A 2004-063592 | 2/2004 |
| JP | A 2003-152239 | 5/2003 | WO | WO 02/078021 A1 | 10/2002 |
| JP | A 2003-163330 | 6/2003 | | | |

* cited by examiner

MAGNETO-RESISTIVE DEVICE, AND MAGNETIC HEAD, HEAD SUSPENSION ASSEMBLY AND MAGNETIC DISK APPARATUS USING MAGNETO-RESISTIVE DEVICE

BACKGROUND OF THE INVENTION

The present invention relates to a magneto-resistive device, and a magnetic head, a head suspension assembly and a magnetic disk apparatus which use the magneto-resistive device.

With the trend to a larger capacity and a smaller size of hard disk drives (HDD), heads are required to have a higher sensitivity and a larger output. To meet these requirements, strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer film) is used for a magneto-resistive device (see JP-A-2003-60262 corresponding to U.S. patent application Publication No. 2003/0039080, and the like). In the TMR head, the magneto-resistive layer generally includes an oxide layer as a tunnel barrier layer. The CCP-GMR head, on the other hand, may include an oxide layer, as a thin insulating layer formed between two layers to such an extent that the insulating layer does not completely electrically insulate between the two layers, in order to effectively reduce the area of a path for a sense current (see JP-A-2003-60262).

Any type of CPP-based heads has an upper electrode and a lower electrode for supplying a current to a magneto-resistive layer formed on a base, formed on the top (opposite to the base) and on the bottom (close to the base) of the magneto-resistive layer, respectively,. Generally, for reasons of manufacturing process, the base formed with the magneto-resistive layer is left in the atmosphere after the magneto-resistive layer is formed and before the upper electrode is formed. In this event, for preventing the top surface of the magneto-resistive layer from being oxidized in the air to damage the characteristics of the magneto-resistive layer such as an MR ratio, a non-magnetic metal layer, referred to as a "cap layer", is previously formed as a protection film on the top surface of the magneto-resistive layer (see JP-A-2002-216321 corresponding to U.S. patent application Publication No. 2002/0135951, JP-A-2000-228003 corresponding to U.S. Pat. No. 6,452,385, JP-A-2003-60262 corresponding to U.S. patent application Publication No. 2003/0039080, and the like). JP-A-2002-216321 discloses a cap layer comprised of a single-layer film made of Ta, Cr, NiCr, Ti or TiW, while JP-A-2000-228003 discloses a cap layer comprised of a single-layer film made of Cu, Al, Rh, Ru, Pt, RuRhMn, PtMn, PtMnRh, or TiW, respectively. JP-A-2000-228003 also discloses a cap layer comprised of a two-layer film made up of a Ta layer (upper) and a PtMn layer (lower (closer to the magneto-resistive layer)); a two-layer film made up of a Ta layer (upper) and a Cu layer (lower); a two-layer film made up of a Ta layer (upper) and an Al layer (lower); a two-layer film made up of a Ta layer (upper) and a Ru layer (lower); a two-layer film made up of a TiW layer (upper) and a Cu layer (lower); a two-layer film made up of a TiW layer (upper) and a Rh layer (lower); or a two-layer film made up of a TiW layer (upper) and a Ru layer (lower). Further, JP-A-2003-60262 discloses a cap layer comprised of a single-layer film or a composite-layer film made of simple Ru, Rh, Os, W, Pd, Pt, Cu, or Ag, or an alloy made up of two or more of these elements in combination. In the CPP-based head, the upper electrode is electrically connected to the magneto-resistive layer through the cap layer.

As will be understood from the foregoing discussion, in the CPP-based magnetic head, for reasons of manufacturing process, the base formed with the magneto-resistive layer and the cap layer is once placed in the atmosphere after the formation of the magneto-resistive layer and cap layer and before the formation of the upper electrode. Subsequently, the upper electrode is formed through several steps, wherein the head characteristic (MR ratio) will be degraded unless a contact resistance is minimized between the cap layer and the upper electrode. The contact resistance is caused by an oxide film on the surface of the cap layer which is formed when the base is exposed to the atmosphere. To address this problem, the surface oxide film on the cap layer is removed by dry etching (including a whole dry process such as sputter etching, ion beam etching, and the like) within the same vacuum chamber in which the upper electrode and the like are deposited, prior to the formation of another layer such as the upper electrode on the cap layer. In other words, the surface of the cap layer is cleaned to reduce the contact resistance.

A thick oxide film can be formed depending on the material for the cap layer. In this event, for sufficiently removing the thick oxide film by dry etching, a long cleaning time is required, resulting in a failure in efficiently manufacturing magnetic heads and an inevitable increase in cost. On the other hand, when a thinner cap layer is formed with the intention of reducing the gap between an upper magnetic shield and a lower magnetic shield to increase the magnetic recording density, long-time ion beam etching or the like performed to sufficiently remove the thick oxide film would increase damages to the magneto-resistive layer (particularly, a tunnel barrier layer or the like) due to the ion beam, resulting in a lower MR ratio.

Therefore, in the CPP-based head, the material for the cap layer is selected from a viewpoint of insusceptibility to oxidization, or a lower resistance even in the event of oxidization, and the cap layer is generally comprised of a single-layer film made of this material. Specifically, the cap layer is generally comprised, for example, of a single-layer film made of Ta or the like, or a single-layer film made of a noble metal such as Rh, Ru, or the like.

As described above, JP-A-2000-228003 also discloses a cap layer comprised of a two-layer film such as a two-layer film made up of a Ta layer (upper) and a Ru layer (lower (closer to the magneto-resistive layer)), and the like. The noble metal layer such as a Ru layer is formed in order to reduce the degree of diffusion of a constituent element in the cap layer (particularly, a constituent element in the upper Ta layer and the like) into the magneto-resistive layer (particularly, the free layer). Therefore, in JP-A-2000-228003, a noble metal layer such as a Ru layer, which forms part of a cap layer, is located closer to a magneto-resistive layer. Therefore, JP-A-2000-228003 does not disclose or suggest the opposite order of the lower noble metal layer and the upper Ta layer. In addition, while JP-A-2003-60262 also discloses a cap layer comprised of a composite-layer film as mentioned above, these materials are selected merely from a viewpoint of insusceptibility to oxidization, or a lower resistance even in the event of oxidization.

Magnetic heads are desired to provide a higher MR ratio for a higher recording density and the like. Also, as will be understood from the foregoing discussion, a reduction in the time required for cleaning the surface of the cap layer could permit magnetic heads to be efficiently manufactured, and would reduce the likelihood of a lower MR ratio, even with a thinner cap layer, because the magneto-resistive layer would be less damaged by an ion beam. These aspects are similarly applied not only to magneto-resistive devices employed in magnetic heads, but also to magneto-resistive devices employed in other applications.

SUMMARY OF THE INVENTION

It is an object of the present invention to provide a magneto-resistive device which can contribute to a higher MR ratio and a reduced cleaning time for cleaning the surface of a cap layer by the employment of a novel structure for the cap layer, and to provide a magnetic head, a head suspension assembly, and a magnetic disk apparatus which employ the magneto-resistive device.

The result of an experiment made by the present inventors has shown that a cap layer of a magneto-resistive device including an oxide layer in a magneto-resistive layer is comprised of two or more conductive layers, wherein the topmost conductive layer (the conductive layer formed furthest away from a base) of the two or more conductive layers is made of a material (hereinafter called the "first material") which is selected from a viewpoint of insusceptibility to oxidization, or a lower resistance even in the event of oxidization, for example, noble metals or the like, and at least one of the remaining conductive layer of the cap layer is made of a material (hereinafter called the "second material") which includes an element that has relatively high oxygen bond energy as compared with elements (generally, Mn, Fe, Co, Ni, Pt, and the like) which make up main magnetic layers that form parts of the magneto-resistive layer, resulting in simultaneous accomplishment of a tendency of increasing the MR ratio, attributable to the second material, and a tendency of reducing the thickness of an oxide film formed on the surface of the cap layer, attributable to the first material. Presumably, the tendency of increasing the MR ratio, attributable to the second material, is accomplished for the following reason. It can be thought that generally, when an oxide layer is included in a magneto-resistive layer, excessive oxygen in the oxide layer will oxidize the main magnetic layers of the magneto-resistive layer, resulting in degraded characteristics of the magnetic layers and a consequent reduction in the MR ratio. In contrast, it is thought that when the cap layer includes a layer made of the second material, the second material which has higher oxygen bond energy serves to absorb the excessive oxygen to reduce the oxidization of the magnetic layers, resulting in the tendency of increasing the MR ratio.

Bearing the foregoing in mind, when a cap layer is comprised of two or more conductive layers with the topmost conductive layer of the two or more conductive layers being made of the first material and at least one of the remaining conductive layers being made of the second material, the MR ratio can be improved as compared with the prior art while the thickness of an oxide film formed on the surface of the cap layer in the middle of manufacturing steps is limited to the same extent as before or less (and therefore, a cleaning time required for cleaning the surface of the cap layer is limited to the same extent as before or shorter), or the thickness of the oxide film formed on the surface of the cap layer can be reduced as compared with the prior art (and therefore, a cleaning time required for cleaning the surface of the cap layer can be reduced as compared with the prior art) while the MR ratio is ensured to be as high as or higher than before.

The present invention has been made based on the novel knowledge as described above. A magneto-resistive device according to a first aspect of the present invention includes a magneto-resistive layer formed on one surface side of a base and including an oxide layer; and a cap layer formed on a surface of the magneto-resistive layer opposite to the base, the cap layer including two or more conductive layers, wherein at least one conductive layer of the two or more conductive layers except for a conductive layer formed furthest away from the base is made of a material which includes an element that has higher oxygen bond energy than Ru and that has higher oxygen bond energy than an element of which a magnetic layer is made between the oxide layer and the cap layer.

Here, the oxygen bond energy of main elements is shown in the following Table 1. The shown bond energy is retrieved from URL "http://www.webelements.com/" on the Internet.

TABLE 1

| Element | Oxygen Bond Energy [kJ/mol] |
|---------|------------------------------|
| Al | 511 ± 3 |
| Si | 799.6 ± 13.4 |
| Ti | 672.4 ± 9.2 |
| V | 626.8 ± 18.8 |
| Cr | 429.3 ± 29.3 |
| Mn | 402.9 ± 41.8 |
| Fe | 390.4 ± 17.2 |
| Co | 384.5 ± 13.4 |
| Ni | 382 ± 16.7 |
| Cu | 269 ± 20.9 |
| Zn | 159 ± 4 |
| Zr | 776.1 ± 13.4 |
| Nb | 771.5 ± 25.1 |
| Mo | 560.2 ± 20.9 |
| Ru | 528.4 ± 41.8 |
| Rh | 405 ± 41.8 |
| Pd | 380.7 ± 83.7 |
| Ag | 220.1 ± 20.9 |
| Cd | 235.6 ± 83.7 |
| Hf | 801.7 ± 13.4 |
| Ta | 779.1 ± 12.6 |
| W | 672 ± 41.8 |
| Ir | 414.6 ± 42.3 |
| Pt | 391.6 ± 41.8 |
| Au | 221.8 ± 20.9 |

As can be seen from Table 1, Ru has significantly higher oxygen bond energy than the elements (generally, Mn, Fe, Co, Ni, Pt, and the like) which make up main magnetic layers that form parts of the magneto-resistive layer.

According to the first aspect, in accordance with the aforementioned knowledge, the MR ratio can be improved as compared with the prior art while the cleaning time required for cleaning the surface of the cap layer is limited to the same extent as before or less, or the cleaning time required for cleaning the surface of the cap layer can be reduced as compared with the before while the resulting MR ratio is at the same level as before or higher.

A magneto-resistive device according to a second aspect of the present invention is arranged in a manner that, in the first aspect, the at least one conductive layer includes a conductive layer of the two or more conductive layers which is formed to be in direct contact with the magneto-resistive layer.

The layer directly in contact with the magneto-resistive layer is preferably made of a material having relatively high oxygen bond energy as in the second aspect, because the magnetic layer which forms parts of the magneto-resistive layer is more prevented from oxidization.

A magneto-resistive device according to a third aspect of the present invention is arranged in a manner that, in the first or second aspect, the conductive layer of the two or more conductive layers which is formed furthest away from the base is made of a noble metal.

When the topmost layer of the cap layer is made of a noble metal as in the third aspect, a cleaning time required for cleaning the surface of the cap layer can be largely reduced because the noble metal has very low oxygen bond energy or a low resistance even if it is oxidized. As a result, the magneto-resistive device can be efficiently manufactured to reduce the cost. Also, with the ability to largely reduce the cleaning time required for cleaning the surface of the cap layer, even if the cap layer is made thinner for a higher magnetic recording density, the damage to the magneto-resistive layer by the ion beam or the like is limited to avoid a lower MR ratio.

Also, in the third aspect, since a layer made of a material including an element having higher oxygen bond energy than Ru (thus, an element having higher oxygen bond energy than noble metals as can be seen from Table 1) is formed between the topmost noble metal layer of the cap layer and the magneto-resistive layer, this layer helps improve the MR ratio, as compared with the cap layer comprised of a single-layer film made of a noble metal, in accordance with the aforementioned knowledge.

A magneto-resistive device according to a fourth aspect of the present invention is arranged in a manner that, in the first or second aspect, the conductive layer of the two or more conductive layers which is formed furthest away from the base includes one or more selected from a group consisting of Ru, Rh, Pd, Ag, Ir, Pt, Au, and an alloy including one or more of the elements.

The fourth aspect enumerates exemplary materials particularly suitable for use in making the topmost layer of the cap layer for reducing the cleaning time required for cleaning the surface of the cap layer.

A magneto-resistive device according to a fifth aspect of the present invention is arranged in a manner that, in the third or fourth aspect, the at least one conductive layer includes one or more selected from a group consisting of Si, Ti, V, Zr, Nb, Mo, Hf, Ta, and W.

The fifth aspect enumerates exemplary materials having relatively high oxygen bond energy, which is suitable for use in making the at least one conductive layer of the cap layer.

A magneto-resistive device according to a sixth aspect of the present invention is arranged in a manner that, in the third or fourth aspect, the at least one conductive layer includes one or more selected from a group consisting of Zr, Hf, and an alloy including one or more of the elements.

The sixth aspect enumerates examples which are particularly suitable for use as a material for the at least one conductive layer of the cap layer. According to the sixth aspect, the MR ratio can be largely improved as compared with the prior art.

A magneto-resistive device according to a seventh aspect of the present invention is arranged in a manner that, in the first or second aspect, the at least one conductive layer includes one or more selected from a group consisting of Zr, Hf, and an alloy including one or more of the elements.

The seventh aspect enumerates examples which are particularly suitable for use as a material for the at least one conductive layer of the cap layer. According to the seventh aspect, the MR ratio can be largely improved as compared with the prior art.

A magneto-resistive device according to a eighth aspect of the present invention is arranged in a manner that, in the seventh aspect, the conductive layer of the two or more conductive layers which is formed furthest away from the base includes one or more selected from a group consisting of Ru, Rh, Pd, Ag, Ir, Pt, Au, Ta, Ti, and an alloy including one or more of the elements.

The eighth aspect enumerates exemplary materials which are suitable in making the topmost layer of the cap layer in the seventh aspect.

A magneto-resistive device according to a eighth aspect of the present invention is arranged in a manner that, in any of the first to the eighth aspects, an effective region effectively involved in detection of magnetism in the magneto-resistive layer is a region in which a current flows in a direction substantially perpendicular to the film surface in the magneto-resistive layer.

The ninth aspect provides an exemplary magneto-resistive device which employs the CPP structure.

A magneto-resistive device according to a tenth aspect of the present invention is arranged in a manner that, in the ninth aspect, the magneto-resistive layer includes a tunnel barrier layer, a free layer formed on one surface side of the tunnel barrier layer, a pinned layer formed on other surface side of the tunnel barrier layer, and a pin layer formed on one surface side of the pinned layer opposite to the tunnel barrier layer, and the oxide layer comprises the tunnel barrier layer.

The tenth aspect provides an example in which the ninth aspect is applied to a TMR device.

A magneto-resistive device according to a eleventh aspect of the present invention is arranged in a manner that, in the ninth aspect, the magneto-resistive layer includes a non-magnetic metal layer, a free layer formed on one surface side of the non-magnetic metal layer, a pinned layer formed on other surface side of the non-magnetic metal layer, a pin layer formed on one surface side of the pinned layer opposite to the non-magnetic metal layer, and an insulating layer formed between arbitrary two layers over a region substantially overlapping with at least the effective region and having such an insulating property that does not completely electrically insulate between the two layers, and the oxide layer comprises the insulating layer. The insulating layer which has such an insulating property that does not completely electrically insulate between the two layers may be, for example, a thin insulating layer to such an extent that the insulating layer does not completely electrically insulate between the two layers, or an insulating layer having an insulating region and small metal regions (leak paths, miniature metal particles, or the like) formed within the insulating region.

The eleventh aspect is an example in which the ninth aspect is applied to a CPP-GMR device.

A magneto-resistive device according to a twelfth aspect of the present invention is arranged in a manner that, in the tenth or eleventh aspect, the free layer is formed on one surface side of the tunnel barrier layer or the non-magnetic metal layer opposite to the base.

The twelfth aspect shows an exemplary order in which the respective layers are formed in a TMR device and a CPP-GMR device.

A magneto-resistive device according to a thirteenth aspect of the present invention is arranged in a manner that, in the tenth or eleventh aspect, the pin layer is formed on one surface side of the tunnel barrier layer or the non-magnetic metal layer opposite to the base.

The thirteenth aspect shows an exemplary order opposite to the twelfth aspect, in which the respective layers are formed in a TMR device and a CPP-GMR device.

A magneto-resistive device according to a fourteenth aspect of the present invention is arranged in a manner that, in any of the first to the thirteenth aspects, the cap layer is formed such that the cap layer substantially exactly overlaps with at least the layer in the magneto-resistive layer furthest away from the base.

According to the fourteenth aspect, when at least the layer in the magneto-resistive layer furthest away from the base is milled into a desired shape, the cap layer can be simultaneously milled, thereby achieving so-called self-alignment. This is preferable because the manufacturing process is simplified.

A magneto-resistive device according to a fifteenth aspect of the present invention includes a pair of electrodes for supplying the magneto-resistive layer with a current in any of the first to fourteenth aspects, wherein at least one of the pair of electrodes is electrically connected to the magneto-resistive layer through the cap layer. The fifteenth aspect shows an exemplary placement of the electrodes.

A magnetic head according to a sixteenth aspect of the present invention includes a base, and a magneto-resistive device according to any of the first to fifteenth aspects, wherein the magneto-resistive device is supported by the base.

According to the sixteenth aspect, since the magnetic head employs the magneto-resistive device according to any of the first to fifteenth aspects, the magnetic head can contribute to an improved MR ratio and efficient manufacturing.

A head suspension assembly according to a seventeenth aspect of the present invention includes a magnetic head according to the sixteenth aspect, and a suspension for supporting the magnetic head mounted near a leading end thereof.

According to the seventeenth aspect, since the head suspension assembly employs the magnetic head according to the sixteenth aspect, the head suspension assembly can contribute an increased recording density and a reduced cost of a magnetic disk apparatus or the like.

A magnetic disk apparatus according to a eighteenth aspect of the present invention includes a head suspension assembly according to the seventeenth aspect, an arm for supporting the head suspension assembly, and an actuator for moving the arm to position the magnetic head.

According to the eighteenth aspect, since the magnetic disk apparatus employs the head suspension assembly according to the seventeenth aspect, the magnetic disk apparatus can contribute to an increased recording density and a reduced cost or the like.

DESCRIPTION OF THE EMBODIMENTS

In the following, a magneto-resistive device, and a magnetic head, a head suspension assembly and a magnetic disk apparatus which use the magneto-resistive device according to the present invention will be described with reference to the accompanying drawings.

First, a magnetic head according to a first embodiment of the present invention will be described with reference FIGS. 1 to 5.

Figure 1:
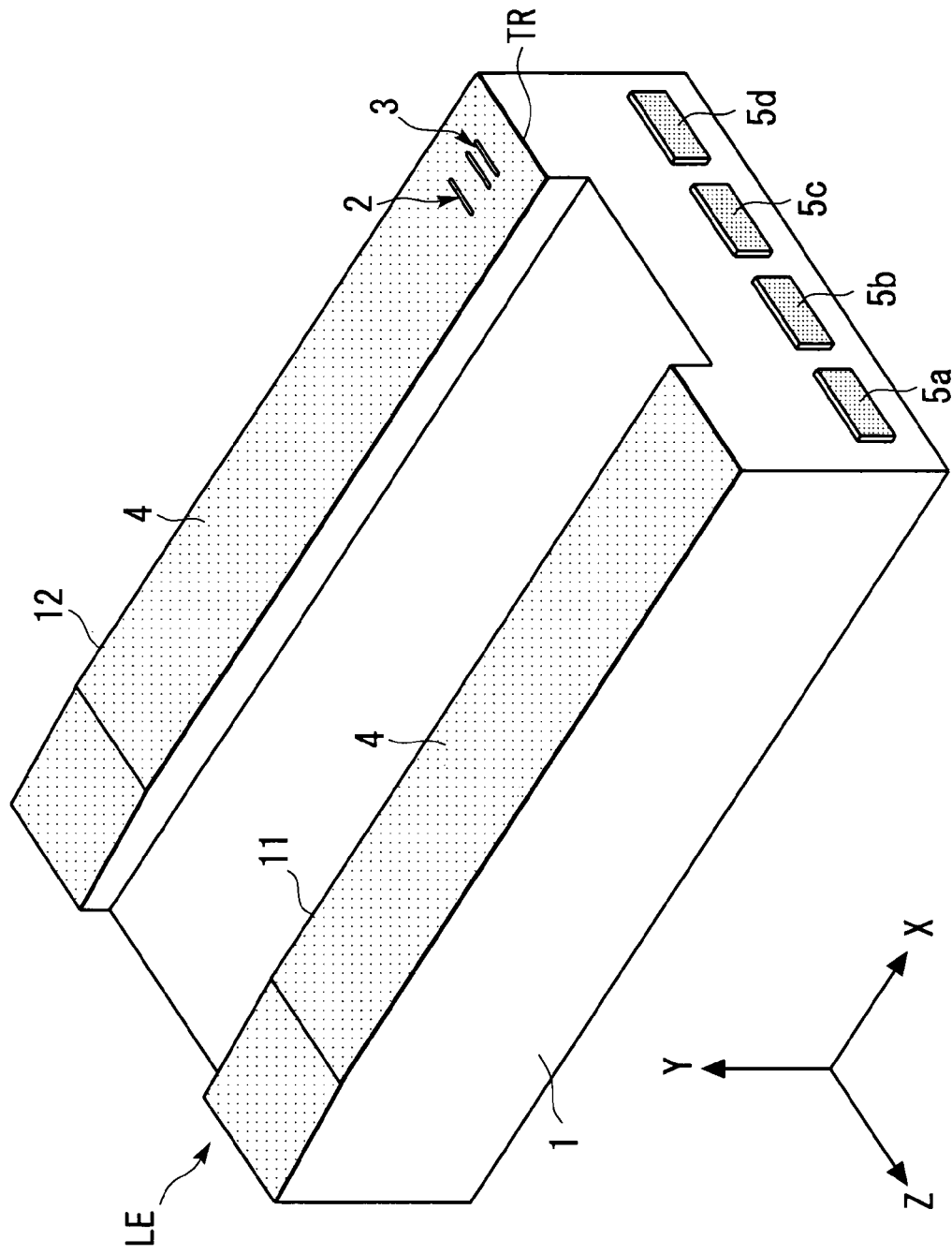
FIG. 1 is a general perspective view schematically illustrating a magnetic head according to a first embodiment of the present invention.
Figure 2:
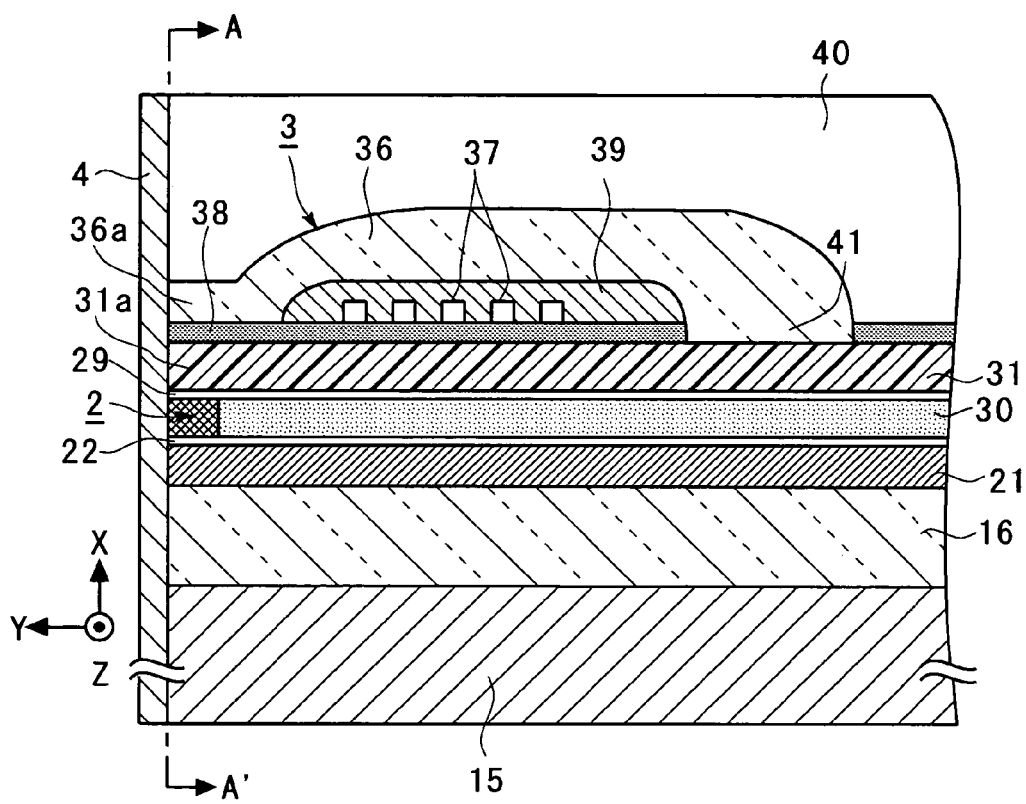
FIG. 2 is an enlarged cross-sectional view schematically illustrating a portion of a TMR device and an inductive magnetic transducing device in the magnetic head illustrated in FIG. 1.
Figure 3:
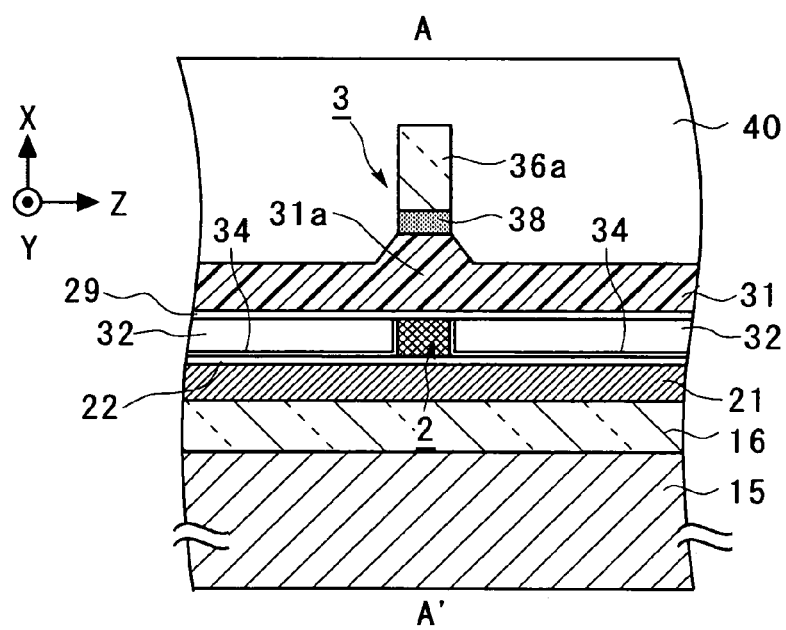
FIG. 3 is a general sectional view taken along a line A-A' indicated by arrows in FIG. 2.
Figure 4:
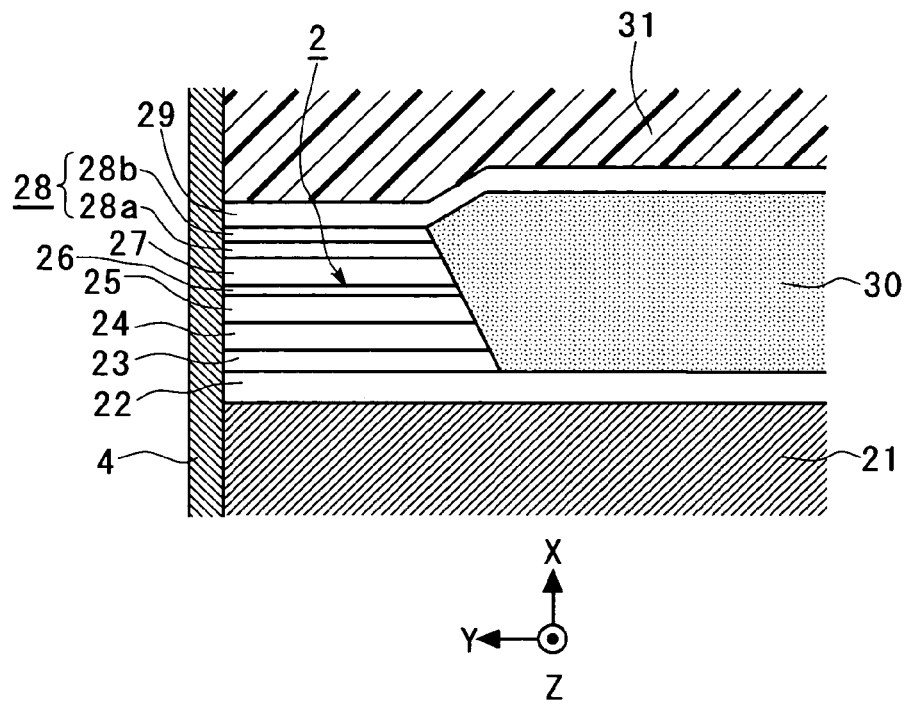
FIG. 4 is a further enlarged view around the TMR device in FIG. 2.
Figure 5:
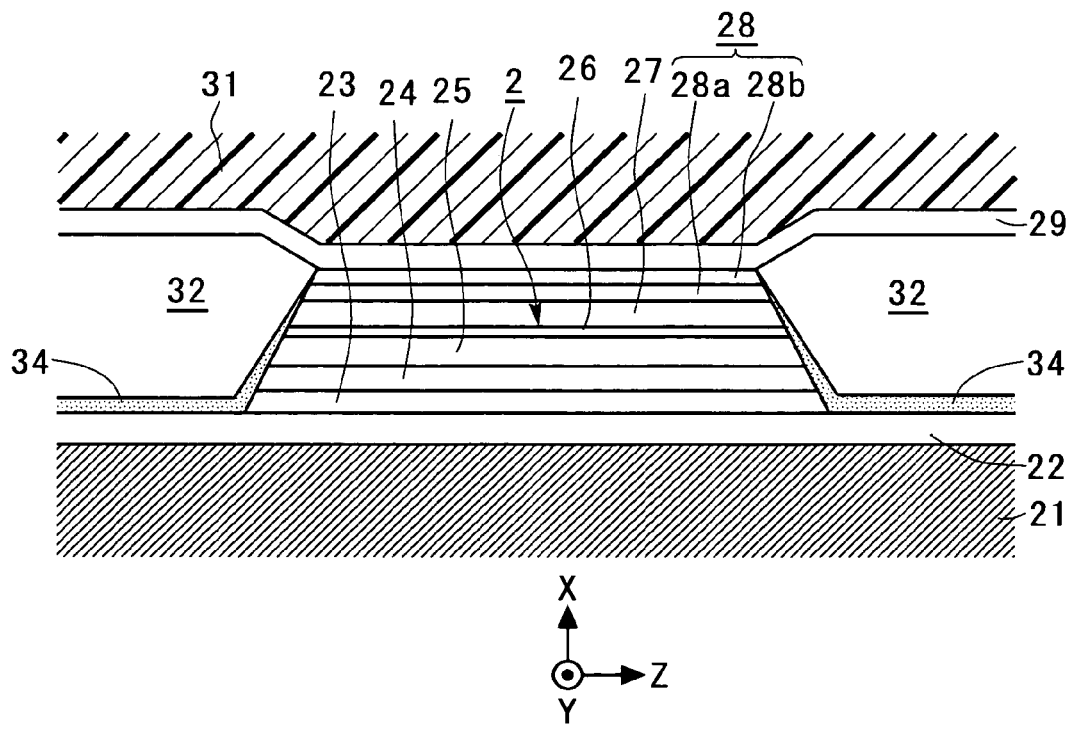
FIG. 5 is a further enlarged view around the TMR device in FIG. 3.

FIG. 1 is a general perspective view schematically illustrating the magnetic head according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A-A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a Z-axis, orthogonal to one another, are defined as shown in FIG. 1 to 5 (the same applies to figures later described). The Z-axis direction indicated by the arrow is referred to as the "+Z-direction" or "+Z-side," and the opposite direction is referred to as the "−Z-direction" or "−Z-side." The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head according to the first embodiment comprises a slider 1 as a base; the TMR device 2 as a magneto-resistive device for use as a magnetic head device for reproduction; an inductive magnetic transducing device 3 as a magnetic head device for recording; and a protection film 4 made of a DLC film or the like, and is configured as a composite magnetic head. However, the magnetic head according to the present invention may comprise only the TMR device 2. Also, while the magnetic head of the first embodiment comprises one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In the first embodiment, the protection film 4 is applied only on the surfaces of the rails 11, 12, so that the surface of the protection film 4 defines the ABS. Actually, the protection film 4 may be applied on the entire surface of the slider 1 opposite to a magnetic recording medium. While the protection film 4 is preferably provided, the protection film 4 may not be necessarily provided.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3.

As illustrated in FIGS. 2 and 3, the TMR device 2 and inductive magnetic transducing device 3 are laminated on an underlying layer 16 deposited on a ceramic base 15 which constitutes the slider 1. The ceramic base 15 is generally made of AlTiC ($Al_2O_3$—TiC), SiC or the like. When $Al_2O_3$—TiC is used, an insulating film made, for example, of $Al_2O_3$ is used for the underlying layer 16 since $Al_2O_3$—TiC is electrically conductive. The underlying layer 16 may not be provided in some cases.

As illustrated in FIGS. 4 and 5, the TMR device 2 comprises a lower electrode 21 formed on the underlying layer 16; an upper electrode 31 formed overlying the lower electrode 21 (opposite to the base 15); and a lower metal layer (lower layer) 22, a lower metal layer (upper layer) 23, a pin layer 24, a pinned layer 25, a tunnel barrier layer 26, a free layer 27, and an cap layer 28 which serves as a protection layer, and an upper metal layer 29 as an underlying layer of the upper electrode 31, which are laminated in this order from the lower electrode 21 between the electrodes 21, 31. The pin layer 24, pinned layer 25, tunnel barrier layer 26 and free layer 27 constitute a magneto-resistive layer. While the actual TMR device 2 typically has a laminate structure composed of a larger number of layers, rather than the laminate structure composed of the number of layers as illustrated, the illustrated magnetic head represents a laminate structure minimally required for the basic operation of the TMR device 2 for simplifying the description.

In the first embodiment, the lower electrode 21 and upper electrode 31 are additionally used as a lower magnetic shield and an upper magnetic shield, respectively. The electrodes 21, 31 are formed of a magnetic material, for example, NiFe or the like. Though not shown, these electrodes 21, 31 are electrically connected to the aforementioned bonding pads 5a, 5b, respectively. It should be understood that a lower magnetic shield and an upper magnetic shield may be provided in addition to the lower electrode 21 and upper electrode 31.

The lower metal layer 22 is an electrically conductive material which is comprised, for example, of a Ta layer or the like. The lower metal layer 23 is an electrically conductive material which is comprised, for example, of an NiFe layer or the like. In the first embodiment, The lower metal layer 23 is formed only coextensively to the magneto-resistive layer, while the lower metal layer 22 widely extends over the electrode 21. Alternatively, the lower metal layer 23 may also be extended widely, or the lower metal layer 22 may be formed only coextensively to the magneto-resistive layer.

The pin layer 24, which is comprised of an antiferromagnetic layer, is preferably formed, for example, of an Mn-based alloy such as PtMn, IrMn, RuRhMn, FeMn, NiMn, PdPtMn, RhMn, CrMnPt, or the like. The pinned layer 25 and free layer 27 are each comprised of a ferromagnetic layer formed of such a material as Fe, Co, Ni, FeCo, NiFe, FeCoNi, or the like. The pinned layer 25 has its magnetization direction fixed in a predetermined direction by an exchange bias magnetic field between the pinned layer 25 and the pin layer 24. On the other hand, the free layer 27 freely varies its magnetization direction in response to an external magnetic field which is basically magnetic information. The pinned layer 25 and free layer 27 are not limited to single-layers, but may implemented, for example, by a laminate comprised of a combination of a pair of magnetic layers in anti-ferromagnetic coupling and a non-magnetic metal layer sandwiched therebetween. Such a laminate may be formed, for example, of three ferromagnetic layers made of CoFe/Ru/CoFe. In the first embodiment, while the pin layer 24, pinned layer 25, tunnel barrier layer 26 and free layer 27 are laminated in this order from the lower electrode 21. Alternatively, the free layer 27, tunnel barrier layer 26, pinned layer 25 and pin layer 24 may be laminated in this order from the lower electrode 21, such that the cap layer 28 is formed to be in contact with the pin layer 24. The tunnel barrier layer 26 is formed, for example, of an oxide such as $Al_2O_3$, NiO, GdO, MgO, $Ta_2O_5$, $MoO_2$, $TiO_2$, $WO_2$, or the like, so that the tunnel barrier layer 26 is an oxide layer.

In the first embodiment, the cap layer 28 is comprised of two conductive layers 28a, 28b. Alternatively, in the present invention, the cap layer 28 may be comprised of three or more conductive layers.

At least one conductive layer (in the first embodiment, the lowermost conductive layer 28a formed to be in direct contact with the free layer 27) of the two conductive layers 28a, 28b except for the topmost conductive layer 28b is made of a material which includes an element that has higher oxygen bond energy than Ru, and that has higher oxygen bond energy than an element of which a magnetic layer (free layer 27 in the first embodiment) is made between the oxide layer (tunnel barrier layer 26 in the first embodiment) and the cap layer 28. Therefore, as can be seen from Table 1, this at least one conductive layer (conductive layer 28a in the first embodiment) is made of a material including an element which has significantly higher oxygen bond energy as compared with a general element of which a magnetic layer (free layer 27 in the first embodiment) is made between the oxide layer (tunnel barrier layer 26 in the first embodiment) included in the magneto-resistive layer and the cap layer 28.

The topmost conductive layer 28b is preferably made of a material which is insusceptible to oxidization or has a lower resistance even if it is oxidized, such as a noble metal, in order to relatively largely reduce a cleaning time required for cleaning the surface of the cap layer 28, as performed in a manufacturing step, described later. With the topmost conductive layer 28b made of such a material, an oxide film formed on the surface of the cap layer 28 (i.e., the surface of the conductive layer 28b) placed in the atmosphere has a sufficiently small thickness or has a low resistance even if it is oxidized, thus making it possible to relatively largely reduce the cleaning time for cleaning the surface of the cap layer 28. Materials which are insusceptible to oxidization or have a low resistance even in the event of oxidization, suitable for use in order to relatively largely reduce the cleaning time for the surface of the cap layer 28, may be noble metals. Also, such a material may be a material which includes one or more selected from a group consisting of Ru, Rh, Pd, Ag, Ir, Pt, Au, and an alloy which includes one or more of these elements.

When the topmost conductive layer 28b is made of a material used to relatively largely reduce the cleaning time for cleaning the surface of the cap layer 28 as mentioned above, the conductive layer 28a is preferably made of a material which includes one or more selected from a group consisting of Si, Ti, V, Zr, Nb, Hf, Ta, and W in order to increase the MR ratio to a certain extent. Among others, the conductive layer 28a is more preferably made of a material including one or more selected from a group consisting of Zr, Hf, and an alloy including one or more of these materials because the resulting MR ratio can be relatively high. These discussions are based on the result of an experiment, later described.

In the present invention, when the conductive layer 28a in the cap layer 28 except for the topmost conductive layer 28b is made of a material which includes one or more selected from the group consisting of Zr, Hf, and an alloy including one ore more of these materials, the topmost conductive layer 28b may be made of a material including one or more selected from a group consisting of Ru, Rh, Pd, Ag, Ir, Pt, Au, Ta, Ti, and an alloy which includes one or more of these elements in order to reduce a cleaning time required for cleaning the surface of the cap layer 28, performed in a manufacturing step, later described, to a certain extent or more.

It should be noted that the layers 24-28 substantially exactly overlap one another, and a region in which they overlap one another functions as an effective region effectively involved in detection of magnetism in the magneto-resistive layer (in the first embodiment, a region in which a current flows in a direction substantially perpendicular to the film plane in the magneto-resistive layer).

The upper metal layer 29, serving as the underlying layer of the upper electrode 31, is made of an electrically conductive material formed of a non-magnetic metal such as Ta or the like. In the first embodiment, the upper metal layer 29 is provided for holding a magnetic shield gap (a gap between the electrodes 21, 31) of a desired dimension. However, the upper metal layer 29 may not be provided.

As illustrated in FIGS. 3 and 5, vertical biasing layers (magnetic domain control layers) 32 for applying a biasing magnetic field to the free layer 27 for magnetic domain control are formed on both sides of the magneto-resistive layer in the Z-axis direction. The vertical biasing layers 32 are formed, for example, of a hard magnetic material such as Cr/CoPt (cobalt platinum alloy), Cr/CoCrPt (cobalt chromium platinum alloy), TiW/CoPt, TiW/CoCrPt, or the like. Alternatively, each of the vertical biasing layers 32 may be, for example, a layer using an switched connection in which a soft magnetic layer and an anti-ferromagnetic layer are laminated. An insulating layer 34 is formed below each of vertical biasing layers 32. The insulating layer 34 also intervenes between end faces of the associated vertical biasing layer 32 and layers 23-28 on the +Z-side and −Z-side, such that the layers 23-28 are not electrically short-circuited by the vertical biasing layer 32. The insulating layer 34 is made of $Al_2O_3$, $SiO_2$ or the like. Also, in a region where the vertical biasing layers 32, 34 are not formed, an insulating layer 30 is formed between the lower metal layer 22 and the upper metal layer 29. The insulating layer 30 covers an end surface on the −Y side of the layers 23-28. The insulating layer 30 is made of $Al_2O_3$, $SiO_2$ or the like.

As illustrated in FIGS. 2 and 3, the inductive magnetic transducing device 3 comprises the upper electrode 31 which is additionally used as a lower magnetic layer for the device 3; an upper magnetic layer 36; a coil layer 37; a write gap layer 38 made of alumina or the like; an insulating layer 39 made of a thermosetting photoresist (for example, an organic resin such as a novolac resin); a protection layer 40 made of alumina or the like, and the like. NiFe, FeN or the like, for example, is used as a material for the upper magnetic layer 36. Leading ends of the upper electrode 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper electrode 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure. The upper electrode 31 may be divided into two layers across an insulating layer made of $Al_2O_3$, $SiO_2$ or the like in order to separate the role of the lower magnetic layer in the inductive magnetic transducing device 3 from the role of the upper electrode in the TMR device 2.

Next, description will be made on an exemplary method of manufacturing the magnetic head according to the first embodiment.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 7A:
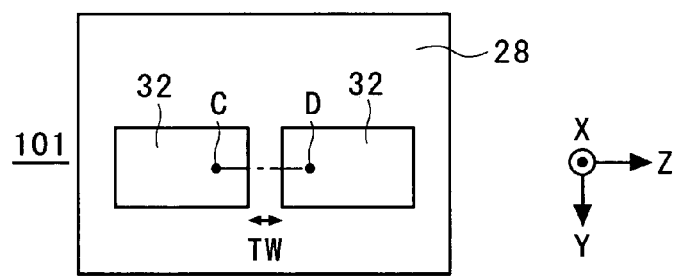
FIGS. 7A and 7B are diagrams schematically illustrating a further step which makes up the wafer process in the method of manufacturing the magnetic head illustrated in FIG. 1.
Figure 7B:
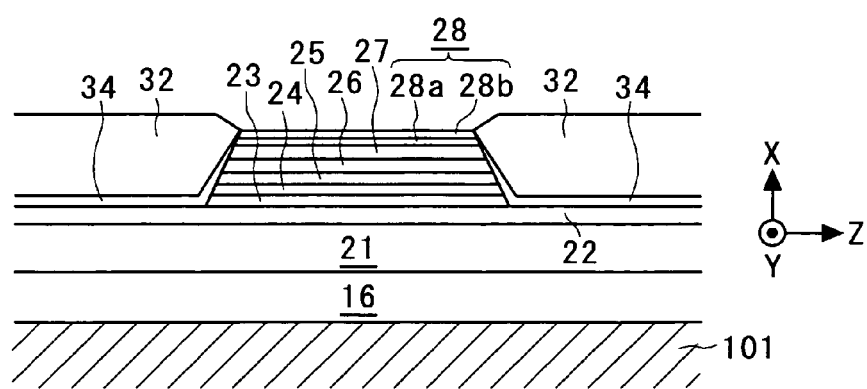
Figure 8A:
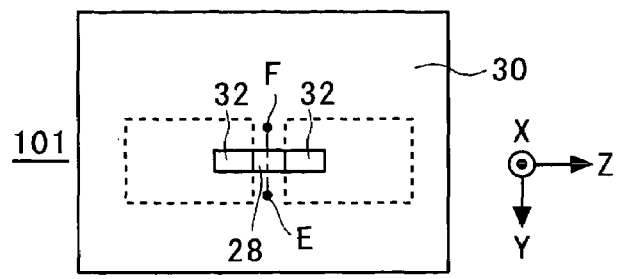
FIGS. 8A and 8B are diagrams schematically illustrating a further step which makes up the wafer process in the method of manufacturing the magnetic head illustrated in FIG. 1.
Figure 8B:
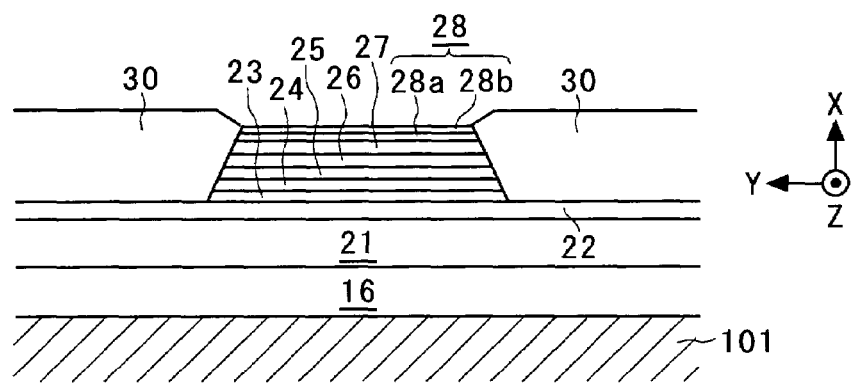

The outline of the wafer process will be described with reference to FIGS. 6 to 9. FIGS. 6 to 9 are diagrams schematically illustrating respective steps which make up the wafer process, wherein FIGS. 6A, 7A, 8A, and 9A are general plan views, respectively; FIG. 6B is a general cross-sectional view taken along a line C-D in FIG. 6A; FIG. 7B is a general cross-sectional view taken along a line C-D in FIG. 7A; FIG. 8B is a general cross-sectional view taken along a line E-F in FIG. 8A; and FIG. 9B is a general cross-sectional view taken along a line E-F in FIG. 9A. In FIG. 7A, TW indicates the width of a track defined by the TMR device 2.

Figure 6A:
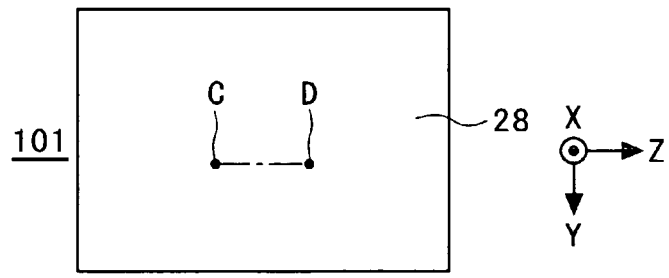
FIGS. 6A and 6B are diagrams schematically illustrating a step which makes up a wafer process in a method of manufacturing the magnetic head illustrated in FIG. 1.
Figure 6B:
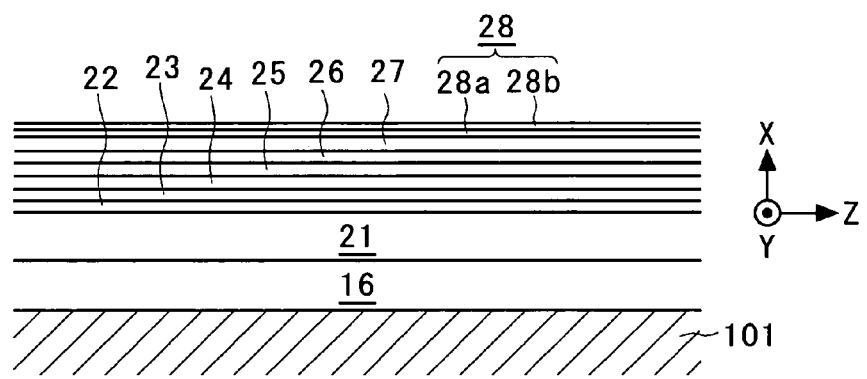

First, in the wafer process, the underlying layer 16, lower electrode 21, lower metal layer 22, lower metal layer 23, pin layer 24, pinned layer 25, tunnel barrier layer 26, free layer 27, and cap layer 28 (i.e., lower conductive layer 28a and upper conductive layer 28b) are sequentially laminated on the wafer 101 (FIGS. 6A and 6B). In this event, the lower electrode 21 is formed, for example, by a plating method, while the other layers are formed, for example, by a sputtering method. Subsequently, the substrate in this state is once left in the atmosphere. In this event, an oxide film (not shown) is formed on the top face of the cap layer 28 (i.e., top face of the conductive layer 28b).

Next, the lower metal layer 23, the pin layer 24, pinned layer 25, tunnel barrier layer 26, free layer 27, cap layer 28 and the oxide film on the cap layer 28 are partially removed for patterning by first ion milling. Next, the insulating layer 34 and vertical biasing layers 32 are formed in the removed portions by a lift-off method (FIGS. 7A and 7B).

Next, the lower metal layer 23, pin layer 24, pinned layer 25, tunnel barrier layer 26, free layer 27, cap layer 28, oxide film (not shown) on the cap layer 28 as mentioned above, insulating layer 34, and vertical biasing layers 32 are partially removed for patterning by second ion milling, while leaving a strip portion which has a necessary width (width in the Y-axis direction) with respect to the height direction of the TMR device 2 and extends in the Z-axis direction by a predetermined distance. Subsequently, the insulating layer 30 is formed in the removed portions by a lift-off method (FIGS. 8A and 8B).

Next, the oxide film formed on the top face of the cap layer 28 is removed for cleaning by dry etching such as sputter etching, ion beam etching or the like in the same vacuum chamber in which the upper metal layer 29 is formed.

Figure 9A:
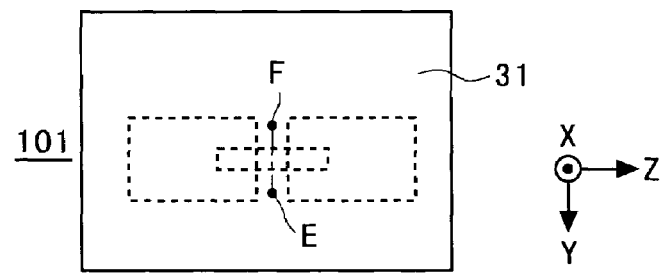
FIGS. 9A and 9B are diagrams schematically illustrating a further step which makes up the wafer process in the method of manufacturing the magnetic head illustrated in FIG. 1.
Figure 9B:
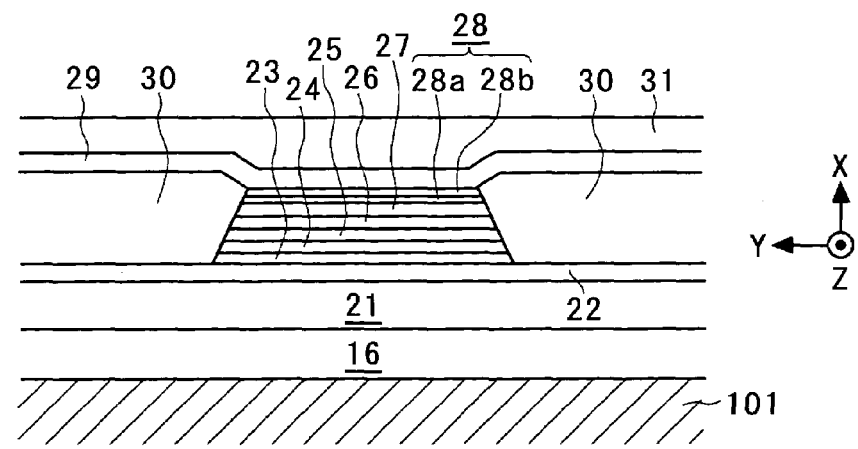

Subsequently, the upper metal layer 29 is formed by a sputtering method or the like, and the upper electrode 31 is formed by a plating method or the like (FIGS. 9A and 9B).

Finally, the write gap layer 38, coil layer 37, insulating layer 39, upper magnetic layer 36, and protection layer 40 are formed, and the electrodes 5a-5d and the like are formed. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Next, a protection film 4 is formed on the surface of the ABS side, and rails 11, 12 are formed by etching or the like. Finally, the bar is cut by machining into individual magnetic heads. In this manner, the magnetic heads according to the first embodiment are completed.

According to the first embodiment, since the cap layer 28 is comprised of the aforementioned two conductive layers 28a, 28b, the resulting magnetic head can simultaneously benefit from the tendency of increasing the MR ratio, attributable to the conductive layer 28a made of the aforementioned material, and the tendency of reducing the thickness of the oxide film formed on the surface of the cap layer 28, attributable to the topmost conductive layer 28b made of the aforementioned material. While excessive oxygen in the tunnel barrier layer 26, which is an oxide layer, attempts to oxidize the free layer 27, the oxygen is absorbed by the conductive layer 28a to reduce the oxidization of the free layer 27, thereby presumably providing the tendency of increasing the MR ratio.

Consequently, according to the first embodiment, the MR ratio can be improved as compared with the prior art while the thickness of the oxide film formed on the surface of the cap layer 28 in the middle of the manufacturing steps is limited to the same extent as before or less (and therefore, the cleaning time required for cleaning the surface of the cap layer 28 is limited to the same extent as before or shorter), or the thickness of the oxide film formed on the surface of the cap layer 28 can be reduced as compared with the prior art (and therefore, the cleaning time required for cleaning the surface of the cap layer 28 can be reduced as compared with the prior art) while the MR ratio is ensured to be as high as or higher than before.

Next, a magnetic head according to a second embodiment of the present invention will be described with reference to FIGS. 10 to 12.

Figure 10:
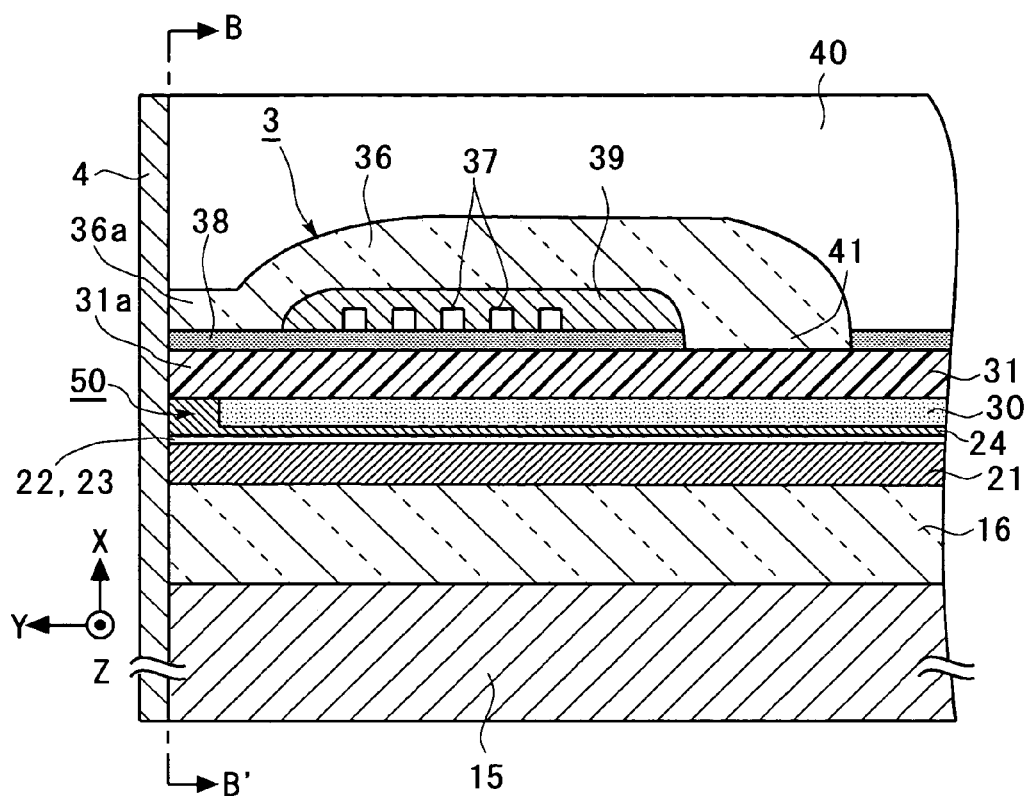
FIG. 10 is an enlarged cross-sectional view schematically illustrating a portion of a GMR device and an inductive magnetic transducing device in a magnetic head according to a second embodiment of the present invention.

FIG. 10 is an enlarged cross-sectional view schematically illustrating a portion of a GMR device 50 and an inductive magnetic transducing device 3 in a magnetic head according to a second embodiment of the present invention. FIG. 11 is a general sectional view taken along a line B-B' indicated by arrows in FIG. 10. FIG. 12 is a further enlarged view illustrating around the GMR device 50 in FIG. 11. FIGS. 10 to 12 correspond to FIGS. 2, 3 and 5, respectively. In FIGS. 10 to 12, components identical or corresponding to those in FIGS. 1 to 5 are designated by the same reference numerals, and repeated description thereon is omitted.

The magnetic head according to the second embodiment is basically similar to the magnetic head disclosed in JP-A-2003-60262 in that it is implemented by a CPP-GMR head having a magneto-resistive layer which includes a thin insulating layer 53, and employs a cap layer 28 comprised of two conductive layers 28a, 28b in the same manner as the first embodiment.

The magnetic head according to the second embodiment differs from the magnetic head according to the first embodiment only in the aspects described below.

Figure 11:
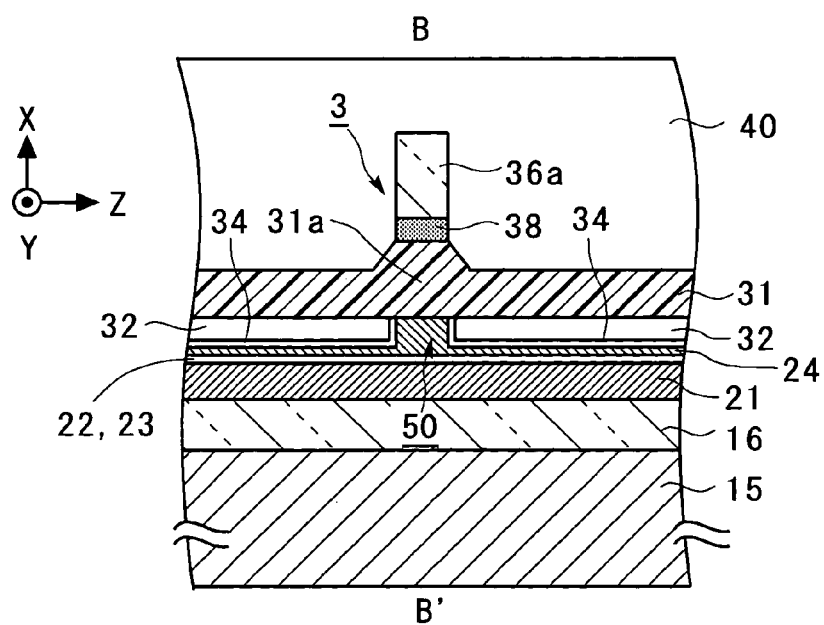
FIG. 11 is a general sectional view taken along a line B-B' indicated by arrows in FIG. 10.
Figure 12:
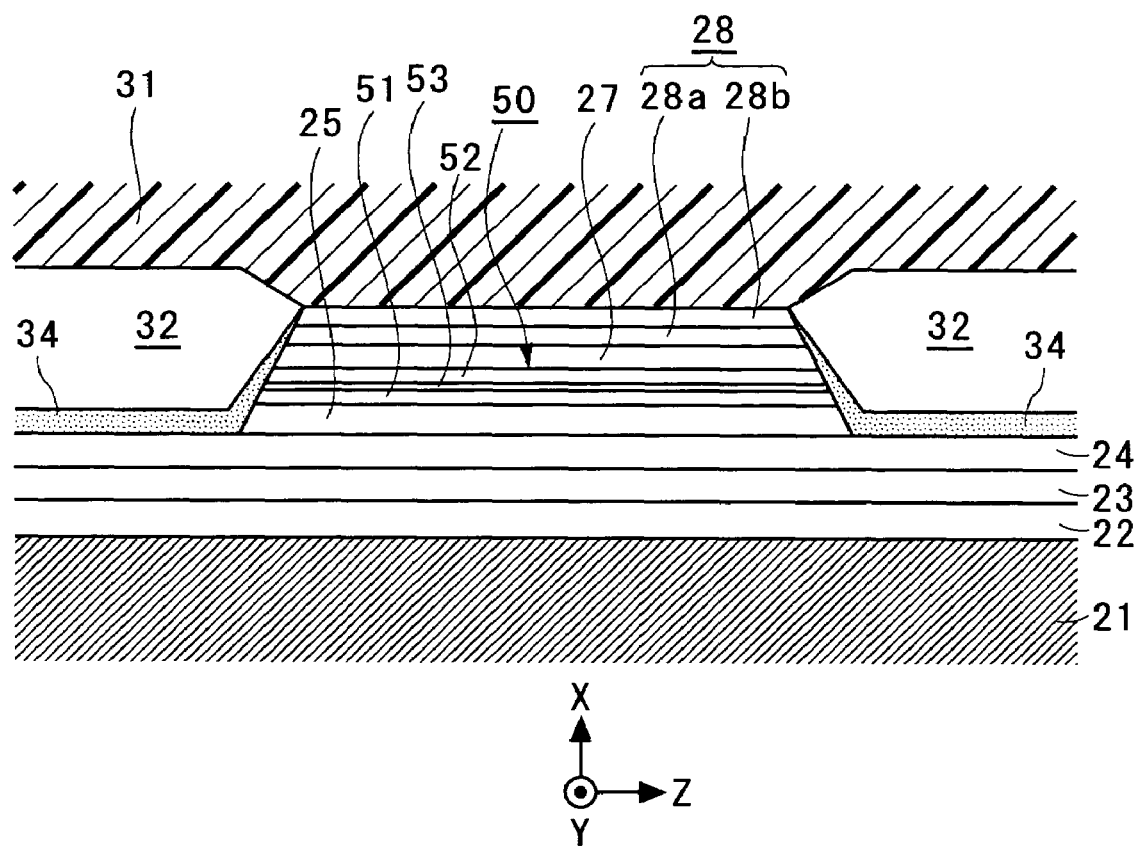
FIG. 12 is a further enlarged view around the GMR device in FIG. 11.

As illustrated in FIGS. 10 to 12, in the second embodiment, a GMR device 50 is formed in pace of the TMR device 2. The GMR device 50 differs from the TMR device 2 in that non-magnetic metal layers 51, 52 are formed in place of the tunnel barrier layer 26, and a thin insulating layer 53 is formed between the non-magnetic metal layers 51, 52. A magneto-resistive layer (a so-called spin valve film in the second embodiment) is made up of a pin layer 24, a pinned layer 25, the non-magnetic metal layer 51, the thin insulating layer 53, the non-magnetic metal layer 52, and a free layer 27 which are formed in this order from below. The non-magnetic metal layers 51, 52 may be formed, for example, of a material such as Cu, Au, Ag, or the like.

In the second embodiment, the pinned layer 25, non-magnetic metal layers 51, 52, thin insulating layer 53, free layer 27, and cap layer 28 substantially exactly overlap one another, and a region in which they overlap one another functions as an effective region effectively involved in detection of magnetism in the magneto-resistive layer (in the second embodiment, a region in which a current flows in a direction substantially perpendicular to the film plane in the magneto-resistive layer). The second embodiment differs from the first embodiment in that the pin layer 24 widely extends beyond a region which overlaps with the effective region, as illustrated in FIGS. 10 to 12. The bottom surface of the pin layer 24 is entirely in electric contact with the top surface of an electrode 21 through lower metal layers 22, 23. The width of the pin layer 24 may be the same as the width of the free layer 27.

In the second embodiment, the thin insulating layer 53 is an oxide layer made, for example, of an oxide of Ta, Al, Co, Fe, Ni, or the like. The thin insulating layer 53 has such a thickness that does not completely electrically insulate between the layers on and beneath the insulating layer 53, and for example, can have a thickness of 1 nm or less. A thin layer such as the thin insulating layer 53 is a film having an insulating region and small metal regions (leak paths, miniature metal particles, or the like) formed within the insulating region. Therefore, the thin insulating layer 53 effectively reduces the area of a path through which a sense current flows between the upper metal layer 27 and free layer 26, thereby providing a similar effect to a reduction in the area of the effective region without actually reducing the area of the effective region. For example, the thin insulating layer 53 may be formed in one or more locations between the layers 24, 25, between the layers 25, 51, between the layers 52, 27, and between the layers 27, 28. Also, when any of the layers 24, 25, 27 is, for example, a laminate of a plurality of layers (a plurality of constituent layers), the thin insulating layer 53 may be formed between two layers of the plurality of constituent layers.

It should be noted that in the second embodiment, the lower metal layer 23 widely extends as does the lower metal layer 22. Also, while the upper metal layer 29 is formed as an underlying layer of the upper electrode 31 in the first embodiment, the upper metal layer 29 is not formed in the second embodiment.

The magnetic head according to the second embodiment can be manufactured by a similar manufacturing method to the magnetic head according to the first embodiment.

In the second embodiment, the cap layer 28 is comprised of the aforementioned two conductive layers 28a, 28b in a manner similar to the first embodiment. Therefore, according to the second embodiment, the MR ratio can be improved as compared with the prior art while the thickness of the oxide film formed on the surface of the cap layer 28 in the middle of the manufacturing steps is limited to the same extent as before or less (and therefore, the cleaning time required for cleaning the surface of the cap layer 28 is limited to the same extent as before or shorter), or the thickness of the oxide film formed on the surface of the cap layer 28 can be reduced as compared with the prior art (and therefore, the cleaning time required for cleaning the surface of the cap layer 28 can be reduced as compared with the prior art) while the MR ratio is ensured to be as high as or higher than before, as is the case with the first embodiment. Presumably, in the second embodiment, the magnetic head provides the tendency of increasing the MR ratio because excessive oxygen in the thin insulating layer 52 which is an oxide layer, that attempts to oxidize the free layer 27, is absorbed by the conductive layer 28a to reduce the oxidization of the free layer 27.

Next, a magnetic disk apparatus according to a third embodiment of the present invention will be described with reference to FIG. 13.

Figure 13:
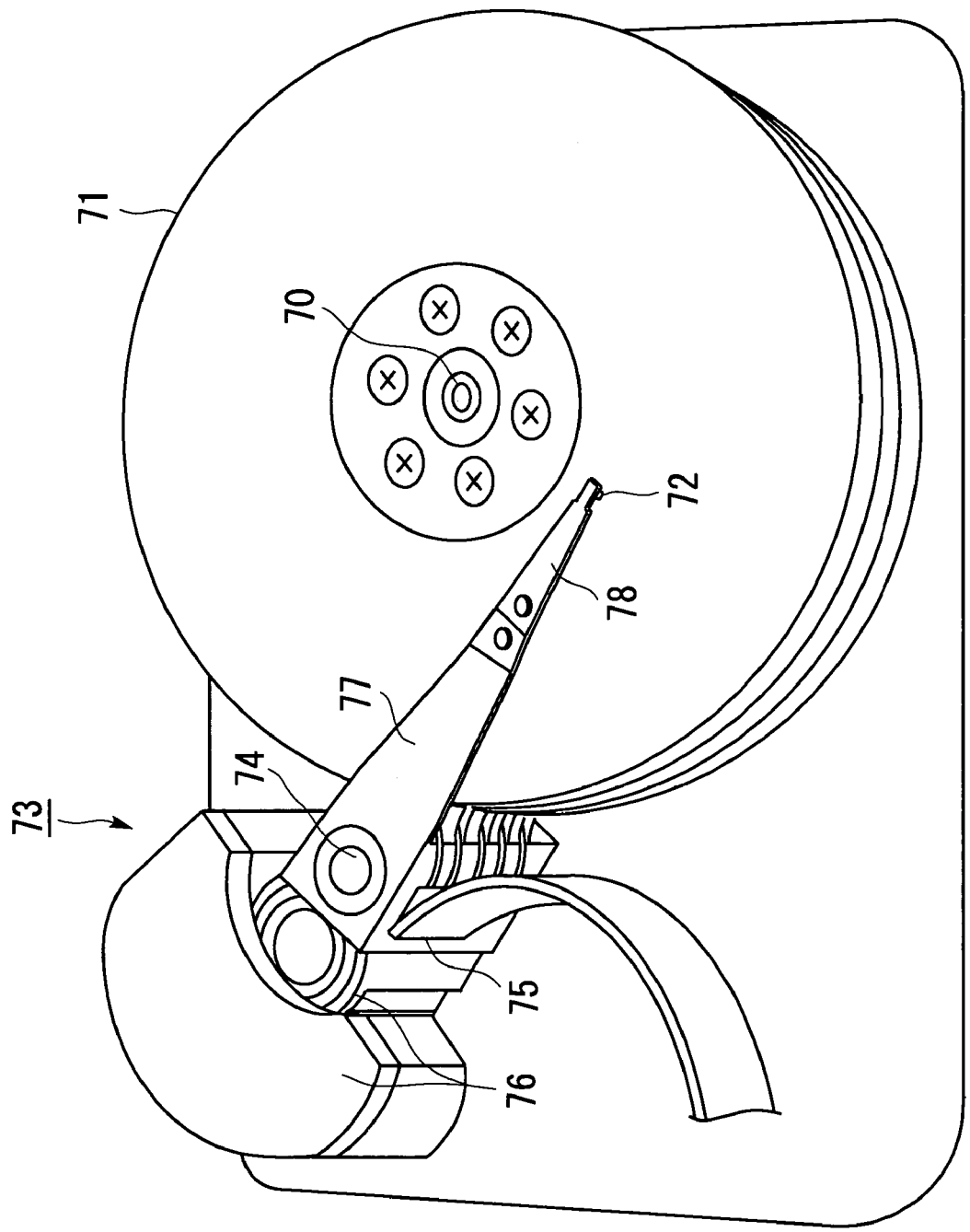
FIG. 13 is a perspective view generally illustrating the configuration of a main portion of a magnetic disk apparatus according to a third embodiment of the present invention.

FIG. 13 is a perspective view generally illustrating the configuration of a main portion of a magnetic disk apparatus according to a third embodiment of the present invention.

The magnetic disk apparatus according to the third embodiment comprises magnetic disks 71 rotatably mounted about a shaft 70; magnetic heads 72 each for recording and reproducing information to or from associated one of the magnetic disks 71; and an assembly carriage device 73 for positioning the magnetic head 72 on a track of the magnetic disk 71.

The assembly carriage device 73 mainly comprises a carriage 75 mounted for pivotal movements about a shaft 74; and an actuator 76 comprised, for example, of a voice coil motor (VCM) for rotating the carriage 75.

The carriage 75 is mounted with bases of a plurality of driving arms 77 which are stacked in the direction of the shaft 74. A head suspension assembly 78 is secured at the leading end of each driving arm 77. Each head suspension assembly 78 has the magnetic head 72 mounted on the leading end thereof. Each head suspension assembly 78 is attached to the leading end of the driving arm 77 such that the associated magnetic head 72 opposes the surface of the associated magnetic disk 71.

In the third embodiment, the magnetic disk apparatus comprises the magnetic heads according to the first or second embodiment described above. Therefore, the magnetic disk apparatus according to the third embodiment can contribute to an increased recording density and a reduced cost or the like.

Wafers (wafers each formed with a large number of TMR devices and inductive magnetic transducing devices) after completion of the wafer process in the manufacturing of magnetic heads having a similar structure to the magnetic head according to the first embodiment were fabricated as samples 1-11 in the same method and conditions as each other, corresponding to the aforementioned manufacturing method, except for the composition of the cap layer 28 and the cleaning time required for cleaning the top surface of the cap layer 28. The compositions of main layers in these samples 1-11 are shown in the following Table 2, and the composition of the cap layer 28 alone was changed as shown in the following Table 3 in the samples 1-11. In these samples 1-11, the track width TW of the TMR device was chosen to be 0.13 μm. Samples 5, 6, 9, 10 correspond to examples of the present invention, respectively, and samples 1-4, 7, 8, 11 correspond to comparative examples, respectively.

TABLE 2

| Name of Layer and Reference Numeral in Drawings | Composition and Thickness of Layer (When composed of two layers or more, a layer more to the left is positioned lower (near the substrate)) |
|---|---|
| Upper Electrode 31 (serving also as Upper Magnetic Shield) | NiFe(2 μm) |
| Upper Metal Layer 29 | Ta(5 nm) |
| Insulating Layer 30 | $Al_2O_3$(60 nm) |
| Vertical Biasing Layer 32 | CrTi(5 nm)/CoCrPt(30 nm)/Ta(5 nm)/ $Al_2O_3$(30 nm) |
| Insulating Layer 34 | $Al_2O_3$(5 nm) |
| Cap Layer 28 | See Table 3 |
| Free Layer 27 | CoFe(1 nm)/NiFe(3 nm) |

TABLE 2-continued

| Name of Layer and Reference Numeral in Drawings | Composition and Thickness of Layer (When composed of two layers or more, a layer more to the left is positioned lower (near the substrate)) |
|---|---|
| Tunnel Barrier Layer 26 (Oxide Layer) | $Al_2O_3$(0.6 nm) |
| Pinned Layer 25 | CoFe(2 nm)/Ru(0.8 nm)/CoFe(3 nm) |
| Pin layer 24 | PtMn(15 nm) |
| Lower Metal Layer 23 | NiFe(2 nm) |
| Lower Metal Layer 22 | Ta(5 nm) |
| Lower Electrode 21 (serving also as Lower Magnetic Shield) | NiFe(2 µm) |

TABLE 3

| | Composition and Thickness of Cap Layer 28 (When composed of two layers, a layer to the left is positioned lower (near the substrate)) |
|---|---|
| Sample 1 | Ta(10 nm) |
| Sample 2 | Rh(10 nm) |
| Sample 3 | Cu(1 nm)/Ta(10 nm) |
| Sample 4 | Cr(1 nm)/Ta(10 nm) |
| Sample 5 | Zr(1 nm)/Ta(10 nm) |
| Sample 6 | Hf(1 nm)/Ta(10 nm) |
| Sample 7 | Al(1 nm)/Ta(10 nm) |
| Sample 8 | Rh(3 nm)/Ta(10 nm) |
| Sample 9 | Ta(10 nm)/Ru(3 nm) |
| Sample 10 | Ta(10 nm)/Rh(3 nm) |
| Sample 11 | Ru(1 nm)/Ta(10 nm) |

During the manufacturing of the samples 1-11, Ar ion beam etching was performed under the following conditions as the cleaning for removing the oxide film formed on the surface of the cap layer 28. An accelerating voltage was set to 250 V; a beam current to 0.1 mA/cm²; and an Ar gas pressure to 2×10⁻⁴ Torr. However, the etching time (i.e., cleaning time), for which the ion beam etching was performed, alone was varied as shown in the following Table 4 for the samples 1-11. The etching time was varied for purposes of substantially sufficiently conducting the cleaning for removing the oxide film on the surface of the cap layer 28 for each of the samples 1-11. It should be noted that all the samples 1-11 have a cap layer 28 which has a sufficiently large overall thickness of 10 nm or more, so that they are presumably free from damages to the tunnel barrier layer 26 and the like due to an ion beam.

TABLE 4

| | MR ratio [%] | Cleaning Time [Seconds] |
|---|---|---|
| Sample 1 | 26.4 | 120 |
| Sample 2 | 9.5 | 10 |
| Sample 3 | 11.1 | 120 |
| Sample 4 | 4.5 | 120 |
| Sample 5 | 30.1 | 120 |
| Sample 6 | 29.4 | 120 |
| Sample 7 | 20.2 | 120 |
| Sample 8 | 20.3 | 120 |
| Sample 9 | 26.7 | 10 |
| Sample 10 | 26.4 | 10 |
| Sample 11 | 24.1 | 120 |

Figure 14:
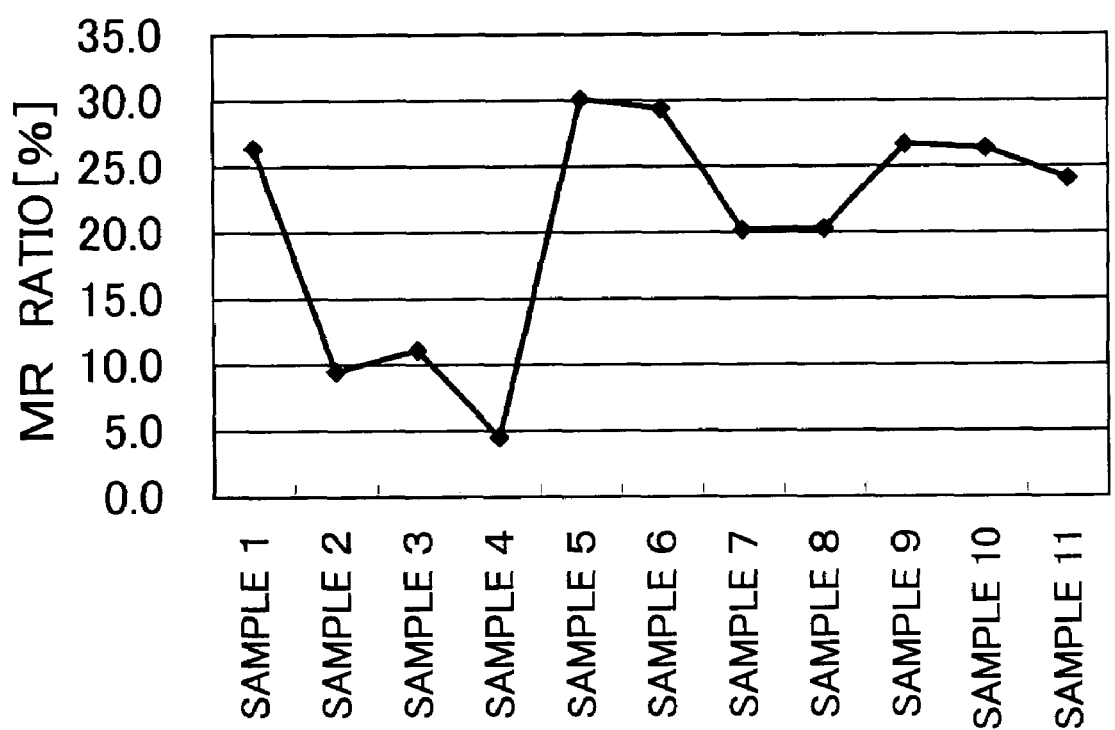
FIG. 14 is a graph showing MR ratios of respective samples.

The MR ratio of all TMR devices formed in the wafers was measured for the respective samples 1-11. Table 4 shows the average MR ratio of all TMR devices formed in the wafers for the respective samples 1-11 as the result of the measurement. FIG. 14 is a graph showing the result of the measurement listed in Table 4. The following facts can be recognized from the shown result of the measurement.

It is found from the result of the measurement made on the samples 1-11 that when a constituent layer of the cap layer 28 in contact with the magneto-resistive layer (free layer 27 in these examples) is made of a material which has higher oxygen bond energy than Ru, such as Ta, Zr, Hf as in the samples 1, 5, 6, 9, 10, the resulting MR ratio is higher than that provided by the like layer made of a material having the oxygen bond energy lower than Ru, such as Rh, Cu, Cr, Al, or made of Ru, as in the samples 2, 3, 4, 7, 8, 11. As will be understood from Table 1, it can be thought that due to the significantly high oxygen bond energy of Ru as compared with the oxygen bond energy of Co, Fe, Ni of which the free layer 27 is made, a material having higher oxygen bond energy than Ru coming into contact with the free layer 27 results in a larger tendency of the absorption of excessive oxygen in the tunnel barrier layer 26 which is an oxide layer, that attempts to oxide the free layer 27, by the material having the oxygen bond energy higher than Ru, leading to a reduction in oxidization of the free layer 27 to increase the MR ratio. It is also understood from the result of the measurement made on the sample 1-11 that the MR ratio is increased particularly when the constituent layer of the cap layer 28 in contact with the magneto-resistive layer is made of Zr or Hf (samples 5, 6), even in comparison with the layer made of Ta. Presumably, this is because Hf has higher oxygen bond energy than Ta and therefore is more apt to absorb the excessive oxygen. As shown in Table 1, while Zr has similar oxygen bond energy to Ta, the resulting MR ratio is higher than that when Ta is used to make the layer, for reasons not completely clarified.

It is also understood from the result of the measurement made on the samples 1, 9, 10 that when the constituent layer of the cap layer 28 in contact with the magneto-resistive layer (free layer 27 in these samples) is made of the same material (Ta in these samples) and has a relatively large thickness (10 nm in these samples), substantially the same MR ratio is achieved irrespective of whether another layer exists on the top surface thereof (samples 9, 10) or not (sample 1), and what material the layer on the top surface is made of when such a layer exists (samples 9, 10). Particularly, it is understood that even when a noble metal layer made of a noble metal such as Ru, Rh is formed on the top surface of the cap layer 28 as in the samples 9, 10, the MR ratio will not be degraded, and the resulting MR ratio is substantially the same as that of the sample 1 which does not have such a noble metal layer formed on the top surface of the cap layer 28.

In regard to the samples 2, 8, even when the constituent layer of the cap layer 28 in contact with the magneto-resistive layer is made of the same Rh, a higher MR ratio is achieved by the sample 8 which has the cap layer 28 comprised of a two-layer film made up of a lower Rh layer and an upper Ta layer than the sample 2 which has the cap layer 28 comprised of a single-layer film made of Rh. Presumably, this is because since the Rh layer in contact with the magneto-resistive layer is relatively thin, i.e., 3 nm in the sample 8, the influence (the tendency of absorbing the excessive oxygen to increase the MR ratio) of relatively high oxygen bond energy of the Ta layer formed on the Rh layer is exerted to the magneto-resistive layer through the Rh layer. It can therefore be thought that even when a layer made of a material having high oxygen bond energy is not in direct contact with the magneto-resistive layer but is in contact with the magneto-resistive layer through an arbitrary layer, it is possible to develop the tendency of increasing the MR ratio with the aid of the layer having high oxygen bond energy, provided that the arbitrary layer is made thin.

It is understood from the result of the measurement made on the samples 1-11 that the samples 2, 9, 10 in which the topmost layer of the cap layer 28 is made of a material (Rh or Ru which is a noble metal in these samples) having relatively low oxygen bond energy require a shorter cleaning time for removing the surface oxide film than the samples 1, 3-8, 11 in which the topmost layer of the cap layer 28 is made of a material (Ta in these samples) having relatively high oxygen bond energy. A shorter cleaning time can contribute to efficient manufacturing of the magneto-resistive devices and magnetic heads and to a reduction in cost. Also, since a shorter cleaning time reduces the damage to the magneto-resistive layer due to the ion beam used during the cleaning, the MR ratio will not be degraded. Thus, the cap layer 28 can be made thinner, thereby narrowing down the gap between the upper magnetic shield 31 and lower magnetic shield 21 to increase the magnetic recording density.

While a relatively high MR ratio is achieved by the sample 1, one of the comparative example, which has the cap layer 28 comprised of a single-layer film made of a material (Ta in the sample 1) having higher oxygen bond energy than Ru, the sample 1 requires a long cleaning time due to a thick oxide film formed on the surface. Conversely, the sample 2, another comparative example, which has the cap layer 28 comprised of a single-layer film made of a material (Rh in the sample 2) having relatively low oxygen bond energy, requires a shorter cleaning time, but suffers from a low MR ratio. The samples 1, 2, which have the cap layer 28 comprised of a single-layer film, are comparative examples provided for purposes of comparison with the present invention.

As can be seen from Table 1, Cu, Cr, Al, Rh, Ru has lower oxygen bond energy than Ta. Within the samples which have the cap layer 28 comprised of the two-layer film, the samples 3, 4, 7, 8, 11, in which the constituent layer of the cap layer 28 closer to the magneto-resistive layer is made of a material having lower oxygen bond energy than the topmost constituent layer, suffer from a lower MR ratio than that of the sample 1. The samples 3, 4, 7, 8, 11 are comparative examples provided for purposes of comparison with the present invention.

Also, within the samples which have the cap layer 28 comprised of the two-layer film, the samples 5, 6, 9, 10 in which the constituent layer other than the topmost constituent layer of the cap layer 28 is made of a material having higher oxygen bond energy than Ru, provide the MR ratios substantially identical or even higher than that of the sample 1 which has the cap layer 28 comprised of a single-layer film made of a material having higher oxygen bond energy than Ru, and provide the MR ratios significantly higher than that of the sample 2 which has the cap layer 28 comprised of a single-layer film made of a material having lower oxygen bond energy than Ru. The samples 5, 6, in which the topmost constituent layer of the cap layer 28 is made of Ta as is the case with the sample 1, require a similar cleaning time to the sample 1, but provide remarkably improved MR ratios as compared with that of the sample 1. The samples 5, 6 correspond to examples of the present invention. The samples 9, 10, in which the constituent layer of the cap layer 28 closer to the magneto-resistive layer is made of Ta as is the case with the sample 1, provide similar MR ratios to that of the sample 1, but require a reduced cleaning time. The samples 9, 10 also correspond to examples of the present invention.

From the investigations made on the result of the measurement described above, the following facts are found. When the cap layer 28 is comprised of two or more conductive layers, with at least one conductive layer of the cap layer 28 except for the topmost conductive layer being made of a material having oxygen bond energy higher than Ru, the MR ratio can be improved as compared with the prior art while the cleaning time required for cleaning the surface of the cap layer 28 is limited to the same extent as before or less, or the cleaning time required for cleaning the surface of the cap layer 28 can be reduced as compared with the prior art while the resulting MR ratio is ensured to be as high as or higher than before. In addition, the topmost layer of the cap layer 28 is preferably made of a noble metal such as Ru, Rh, or the like, because of a reduction in the cleaning time required for cleaning the surface of the cap layer 28. Other than Ru, Rh, the topmost layer of the cap layer 28 is preferably made of Pd, Ag, Ir, Pt, Au which likewise have low oxygen bond energy, an alloy containing one or more of these elements, and the like. The conductive layer in the cap layer 28 other than the topmost conductive layer is preferably made of Si. Ti, V, Zr, Nb, Hf, Ta, W, or the like which have relatively high oxygen bond energy for relatively increasing the MR ratio, and preferably made of Zr, Hf, or the like for further increasing the MR ratio.

As described above, although the explanation has been made as to the respective embodiments according to the present invention and the modifications thereof, the present invention is not limited thereto.

For example, while the foregoing embodiments have shown examples in which the present invention is applied to a TMR device or a CPP-GMR including an inserted oxide layer, the present invention can be applied as well to a magneto-resistive device which has a magneto-resistive layer including an oxide layer.

Also, while the foregoing embodiments have shown examples in which the present invention is applied to a magnetic head that employs a magneto-resistive device, the present invention can be applied as well to other devices that employ a magneto-resistive device, for example, MRAM, magnetic detector, and the like.

As described above, the present invention can provide a magneto-resistive device which can contribute to an improved MR ratio and a shorter cleaning time required for cleaning the surface of the cap layer, with the employment of a novel structure of the cap layer, and a magnetic head, a head suspension assembly, and a magnetic disk apparatus which employ the magneto-resistive device.

What is claimed is:

1. A magneto-resistive device comprising:
a magneto-resistive layer formed on one surface side of a base and including an oxide layer; and
a cap layer formed on a surface of the magneto-resistive layer opposite to the base, the cap layer including two or more conductive layers, wherein at least one conductive layer of the two or more conductive layers except for a conductive layer formed furthest away from the base is made of a material that includes an element that has higher oxygen bond energy than Ru and that has higher oxygen bond energy than an element of which a magnetic layer is made between the oxide layer and the cap layer, wherein the at least one conductive layer includes one or more selected from a group consisting of Zr, Hf, and an alloy including one or more of the elements, wherein the conductive layer of the two or more conductive layers that is formed furthest away from the base is made of a noble metal, an effective region effectively involved in detection of magnetism in the magneto-resistive layer is a region in which a current flows in a direction substantially perpendicular to the film surface in the magneto-resistive layer, wherein the magneto-resistive layer includes a tunnel barrier layer, a free layer formed on one surface side of the tunnel barrier layer, a pinned layer formed on other surface side of the tunnel barrier layer, and a pin layer formed on one surface side of the pinned layer opposite to the tunnel barrier layer, wherein the oxide layer comprises the tunnel barrier layer, and wherein the free layer is formed on one surface side of the tunnel barrier layer opposite to the base.

2. The magneto-resistive device according to claim 1, wherein the cap layer is formed such that the cap layer exactly overlaps with at least the layer in the magneto-resistive layer furthest away from the base.

3. The magneto-resistive device according to claim 1, further comprising a pair of electrodes for supplying the magneto-resistive layer with a current, wherein at least one of the pair of electrodes is electrically connected to the magneto-resistive layer through the cap layer.

4. A magnetic head comprising:
a base; and
the magneto-resistive device according to claim 1, wherein the magneto-resistive device is supported by the base.

5. A head suspension assembly comprising:
the magnetic head according to claim 4; and
a suspension for supporting the magnetic head mounted near a leading end thereof.

6. A magnetic disk apparatus comprising:
the head suspension assembly according to claim 5;
an arm for supporting the head suspension assembly; and
an actuator for moving the arm to position the magnetic head.

7. A magneto-resistive device comprising:
a magneto-resistive layer formed on one surface side of a base and including an oxide layer; and
a cap layer formed on a surface of the magneto-resistive layer opposite to the base, the cap layer including two or more conductive layers, wherein at least one conductive layer of the two or more conductive layers except for a conductive layer formed furthest away from the base is made of a material that includes an element that has higher oxygen bond energy than Ru and that has higher oxygen bond energy than an element of which a magnetic layer is made between the oxide layer and the cap layer, wherein the at least one conductive layer includes one or more selected from a group consisting of Zr, Hf, and an alloy including one or more of the elements, wherein the conductive layer of the two or more conductive layers that is formed furthest away from the base includes one or more selected from a group consisting of Ru, Rh, Pd, Ag, Ir, Pt, Au, and an alloy including one or more of the elements, an effective region effectively involved in detection of magnetism in the magneto-resistive layer is a region in which a current flows in a direction substantially perpendicular to the film surface in the magneto-resistive layer, wherein the magneto-resistive layer includes a tunnel barrier layer, a free layer formed on one surface side of the tunnel barrier layer, a pinned layer formed on other surface side of the tunnel barrier layer, and a pin layer formed on one surface side of the pinned layer opposite to the tunnel barrier layer, wherein the oxide layer comprises the tunnel barrier layer, and wherein the free layer is formed on one surface side of the tunnel barrier layer opposite to the base.

8. The magneto-resistive device according to claim 7, wherein the cap layer is formed such that the cap layer exactly overlaps with at least the layer in the magneto-resistive layer furthest away from the base.

9. The magneto-resistive device according to claim 7, further comprising a pair of electrodes for supplying the magneto-resistive layer with a current, wherein at least one of the pair of electrodes is electrically connected to the magneto-resistive layer through the cap layer.

10. A magnetic head comprising:
a base; and
the magneto-resistive device according to claim 7, wherein the magneto-resistive device is supported by the base.

11. A head suspension assembly comprising:
the magnetic head according to claim 10; and
a suspension for supporting the magnetic head mounted near a leading end thereof.

12. A magnetic disk apparatus comprising:
the head suspension assembly according to claim 11;
an arm for supporting the head suspension assembly; and
an actuator for moving the arm to position the magnetic head.

* * * * *